(12) United States Patent  (10) Patent No.: US 7,722,190 B2
Weng et al.  (45) Date of Patent: May 25, 2010

(54) PROJECTING A LUMINANCE IMAGE

(75) Inventors: Jian-gang Weng, Corvallis, OR (US);
Gregory J. May, Corvallis, OR (US);
Ron R. Bendsneyder, Albany, OR (US);
William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 11/205,672

(22) Filed: Aug. 17, 2005

(65) Prior Publication Data

US 2007/0040989 A1 Feb. 22, 2007

(51) Int. Cl.
*G03B 21/14* (2006.01)
(52) U.S. Cl. ............... 353/31; 353/121; 353/30; 359/443; 359/460
(58) Field of Classification Search ......... 359/443–461; 349/5, 67, 106, 7, 8, 9; 353/74–79, 84, 122, 353/31, 30, 94, 88
See application file for complete search history.

(56) References Cited

U.S. PATENT DOCUMENTS

| | | | |
|---|---|---|---|
| 4,928,123 A | 5/1990 | Takafuji | |
| 5,278,681 A * | 1/1994 | Gitlin et al. | 349/61 |
| 5,287,131 A | 2/1994 | Lee | |
| 5,585,946 A | 12/1996 | Chern | |
| 5,784,138 A | 7/1998 | Kollarits et al. | |
| 6,163,348 A * | 12/2000 | Izumi et al. | 348/761 |
| 6,466,185 B2 | 10/2002 | Sullivan et al. | |
| 6,467,909 B2 * | 10/2002 | Inoue et al. | 353/30 |
| 6,483,643 B1 | 11/2002 | Zuchowski | |
| 6,538,814 B2 | 3/2003 | Hunter et al. | |
| 6,588,909 B2 | 7/2003 | Yaniv et al. | |
| 6,650,470 B1 | 11/2003 | Turner et al. | |
| 6,769,774 B2 | 8/2004 | McDowell | |
| 6,817,717 B2 * | 11/2004 | Childers et al. | 353/31 |
| 6,891,672 B2 * | 5/2005 | Whitehead et al. | 359/443 |
| 7,106,505 B2 * | 9/2006 | Whitehead et al. | 359/443 |
| 7,220,006 B2 * | 5/2007 | Allen et al. | 353/85 |
| 7,403,332 B2 * | 7/2008 | Whitehead et al. | 359/443 |
| 7,413,309 B2 * | 8/2008 | Whitehead et al. | 353/30 |
| 7,457,035 B2 * | 11/2008 | Fricke et al. | 359/443 |
| 2002/0163482 A1 | 11/2002 | Sullivan | |
| 2003/0174295 A1 | 9/2003 | Yaniv et al. | |
| 2004/0004697 A1 * | 1/2004 | Hubel et al. | 353/31 |
| 2004/0012849 A1 * | 1/2004 | Cruz-Uribe et al. | 359/449 |
| 2006/0250585 A1 * | 11/2006 | Anderson et al. | 353/79 |
| 2006/0279839 A1 | 12/2006 | May et al. | 359/443 |
| 2007/0040989 A1 * | 2/2007 | Weng et al. | 353/30 |
| 2007/0081130 A1 * | 4/2007 | May et al. | 353/85 |

* cited by examiner

*Primary Examiner*—William C Dowling

(57) ABSTRACT

A color image is displayed on a screen and a luminance image is projected onto the screen. The luminance image has a greater resolution than the color image.

26 Claims, 3 Drawing Sheets

FIG. 4
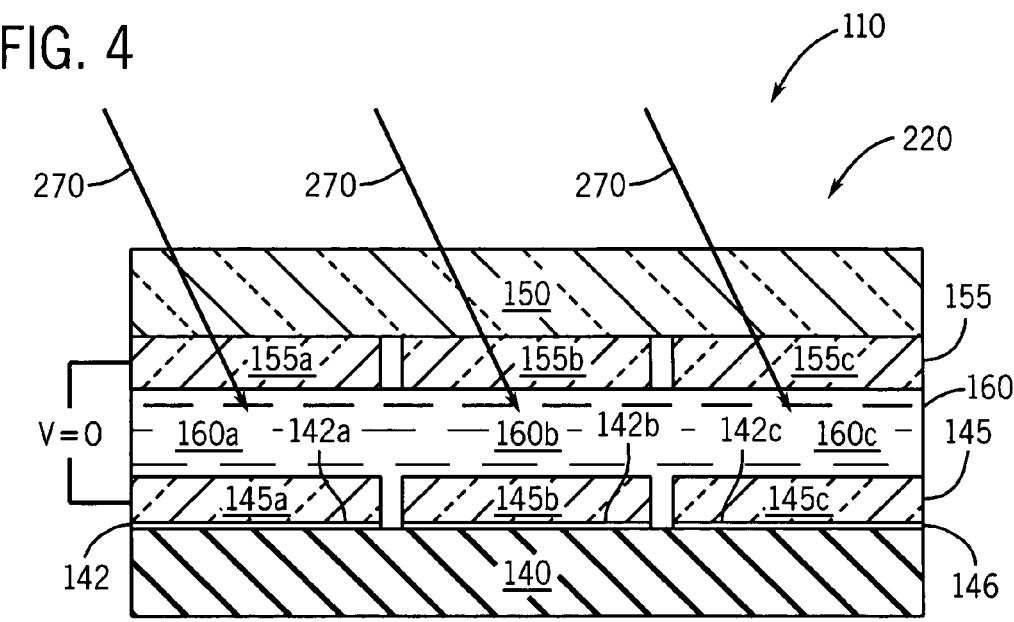
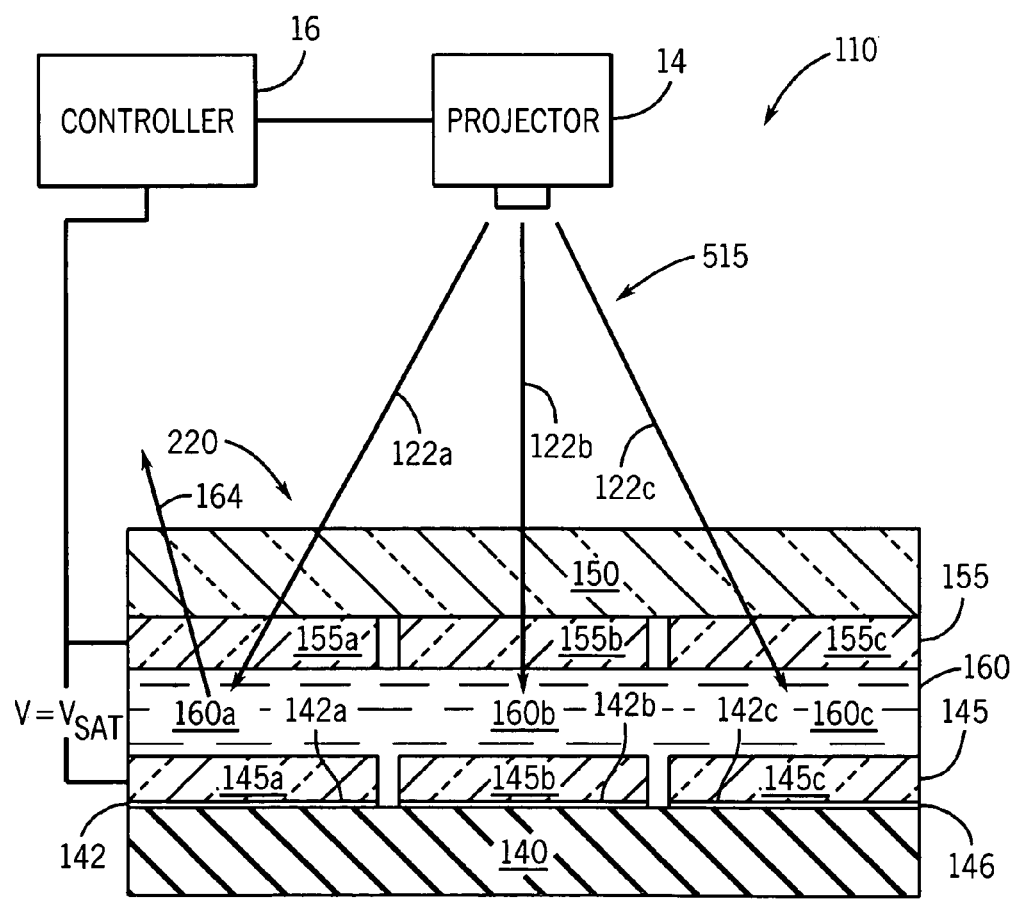
FIG. 5

PROJECTING A LUMINANCE IMAGE

BACKGROUND

Projection systems form images by projecting light onto a reflective screen. Ambient light may also be reflected off of the screen, reducing contrast.

BRIEF DESCRIPTION OF THE DRAWINGS

FIG. 4 is a schematic illustration of an embodiment of a screen pixel of the projection system of FIG. 3 in an ambient light absorbing state according to an example embodiment.

FIG. 5 is a schematic illustration of the projection system of FIG. 3 depicting an embodiment of a screen pixel in a reflective state according to an example embodiment.

DETAILED DESCRIPTION OF EXAMPLE EMBODIMENTS

Figure 1:
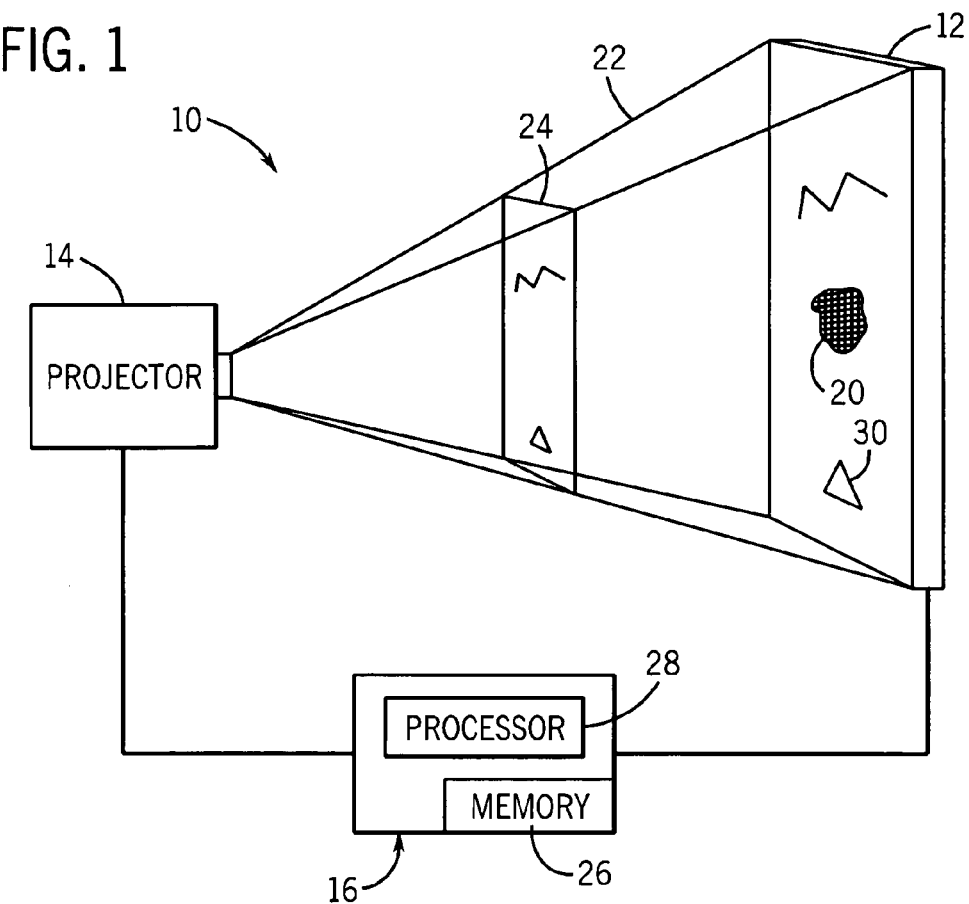
FIG. 1 is a schematic illustration of an embodiment of a projection system according to an example embodiment.

FIG. 1 schematically illustrates projection system 10 which generally includes screen 12, projector 14 and controller 16. Screen 12 generally comprises a front projection screen configured to selectively reflect and absorb light such that different colored light is reflected from different portions of screen 12. As illustrated by the greatly enlarged portion shown in FIG. 1, screen 12 includes a multitude of finite light-absorbing and reflecting portions referred to as screen pixels 20. In one embodiment, each pixel 20 is configured to selectively absorb and reflect light such that light reflected from pixel 20 has a wavelength or color that may vary with respect to light reflected from one or more adjacent pixels or clusters of pixels 20. In the particular embodiment illustrated, screen 12 is configured to selectively actuate each of its pixels 20 such that pixels 20 form a color image.

According to yet another embodiment, screen 12 may alternatively be configured to display a single color substantially across the entire portion of its face having the capability to selectively reflect and absorb light. In such an embodiment, screen 12 may effectively comprise a single pixel 20. For example, in one embodiment, screen 20 may be configured to sequentially display a red color, green color and a blue color (or such colors in other orders) across its face. In yet another embodiment, screen 20 may be configured to sequentially display a red color, a green color, a blue color and white substantially across the entirety of its face. In such an embodiment, screen 20 is configured to display each of the red color, the green color and the blue color at least 50 times per second and nominally at least 72 times per second. According to one exemplary embodiment, screen 12 may comprise a polymer dispersed liquid crystal screen. In other embodiments, screen 12 may comprise other direct view subtractive display technologies.

Projector 14 comprises a device configured to project light 22 upon screen 12. The light 22 impinging screen 12 is reflected, absorbed or partially reflected from pixels 20 of screen 12. As shown in FIG. 1, projector 14 is configured to project a luminance image 24 or luminance information upon screen 12. In one embodiment, projector 14 may be configured to project a luminance image (i.e. light in a pattern or image of varying intensity levels, such as varying brightness levels) combined with one or more colors of light. And yet another embodiment, projector 14 may be configured to project a luminance image absent color information, sometimes referred to as a gray scale or black and white image. For the purposes of this disclosure, the term, "luminance image" shall mean an image formed of light in patterns or images of varying intensity levels, such as varying brightness levels across an image with or without additional color information, such as the hue or chroma information. The term "gray scale image" shall refer to a luminance image excluding color.

In one embodiment, projector 14 may comprise a digital light processing (DLP) projector. In one particular embodiment, the DLP projector may omit a color wheel where grayscale images are projected onto screen 12. In other embodiments, projector 14 may comprise other projection devices configured to project at least a grayscale image at and upon screen 12.

Controller 16 comprises a processing unit configured to generate control signals for the operation of screen 12 and projector 14. Controller 16 generally includes memory 26 and processor 28. Memory 26 comprises a computer readable medium such as random access memory (RAM), read-only-memory (ROM) or some other form of persistent storage. Memory 26 may comprise hard-wired circuitry, optical media, magnetic media or other forms of media configured to store data and instructions. In one embodiment, memory 26 may be permanently associated with processor 28. In another embodiment, memory 26 may be portable or removable with respect to processor 28. In particular embodiments, portions of memory 26 may be permanently associated with processor 28 while portions of memory 26 are portable or removable. Memory 26 contains stored instructions for processor 28.

Processor 28 comprises a processing device configured to generate control signals and to perform calculations based upon instructions contained in memory 26. In one embodiment, processor 28 and memory 26 may be physically associated with projector 14. In another embodiment, processor 28 and memory 26 may be physically associated with screen 12. In still another embodiment, processor 28 and memory 26 may be physically associated with another module or electronic device independent of screen 12 and projector 14.

Processor 28 communicates control signals to screen 12 and projector 14 so as to coordinate the operation of screen 12 and projector 14. In one embodiment, processor 28 may communicate to screen 12 and/or projector 14 via hard-wiring, electrical cabling or optical cabling. In another embodiment, processor 28 may communicate control signals to screen 12 and projector 14 wirelessly.

According to one exemplary embodiment, controller 28 is configured to receive data representing a viewable composite image to be reflected from screen 12. Memory 26 contains stored instructions configured to direct processor 28 to divide the data corresponding to the image to be reflected by screen 12 into data corresponding to individual image pixels. Memory 26 further contains stored instructions for directing processor 28 to form or otherwise break down the image data for the desired image into its chrominance or color component 30 (also known as a color channel) and its corresponding luminance or grayscale component 24 (also known as a black and white component or channel) (shown in FIG. 1). Memory 26 contains stored instructions to further direct processor 28 to generate control signals which are communicated to screen 12 and which direct individual pixels 20 of screen 12 to selectively reflect and absorb ambient light and light 22 from projector 14 based upon the color or chrominance component of the image. Memory 26 further contains stored instructions directing processor 28 to generate control signals which are communicated to projector 14 to direct projector 14 to project light in the form of a black and white or grayscale component 24 of the image onto screen 12 and onto the color component 30 displayed on screen 12.

In operation, ambient light substantially uniformly impinges screen 12 with generally the same luminance or intensity across screen 12. The grayscale component 24 has varying levels of lightness and darkness which vary across screen 12 from pixel 20 to pixel 20. The light projected by projector 14 comprising grayscale component 24 of the image to be finally reflected from screen 12 impinges upon screen 12 and is selectively absorbed by pixels 20 which provide chrominance information, as represented by color component 30.

Because pixels 20 are controlled to selectively absorb or reflect both light from projector 14 and ambient light, the contrast ratio of the image reflected from screen 12 may be enhanced. Therefore, projection system 10 may reduce contrast loss due to ambient light contamination over front projection systems that do not implement the disclosed techniques. Contrast ratio of system 10 is approximately the multiplicative product of the contrast ratio of projector 14 and the contrast ratio of screen 12 in a given ambient light situation. For example, in one embodiment, screen 12 may have a modest 5:1 contrast ratio, reducing the ambient light level by 80% and thereby quintupling the perceived image contrast. Because projector 14 projects the grayscale component 24 of the image to be reflected from screen 12, the intensity of light to be reflected from individual pixels 20 of screen 12 is controlled, increasing the intensity of color or color saturation of the image being reflected from screen 12.

In addition to substantially providing the image reflected from screen 12 with an enhanced contrast ratio and greater color saturation, projection system 10 may be also provide greater resolution at a lower cost. According to one exemplary embodiment, screen 12 has a first resolution while projector 14 has a second greater resolution. In particular, system 10 enables screen 12 to have a significantly lower resolution as compared to projector 14 while at least maintaining the resolution of the final image reflected from screen 12. In particular, the lower resolution chrominance information provided by screen 12, when combined with a higher resolution luminance information provided by projector 14, produces an image reflected from screen 12 that has a higher resolution than the resolution of the chrominance information. Because screen 12 may have a reduced resolution as compared to the image reflected from screen 12, the cost of screen 12 may be reduced. In addition, because projector 14 may project monochromatic images, a color wheel may be omitted. Because no color information is processed by projector 14, its optic design is simpler and its costs may be reduced. In addition to the potentially enabling screen 12 to have a lower resolution while maintaining the final quality of the image reflected from screen 12, system 10 may also enable the use of a screen having a slower response time than that would otherwise be used for a direct view display operated without a projector since a large portion of the information of the final image to be reflected from screen 12 is carried by the grayscale component of the image provided by projector 14.

Figure 2A:
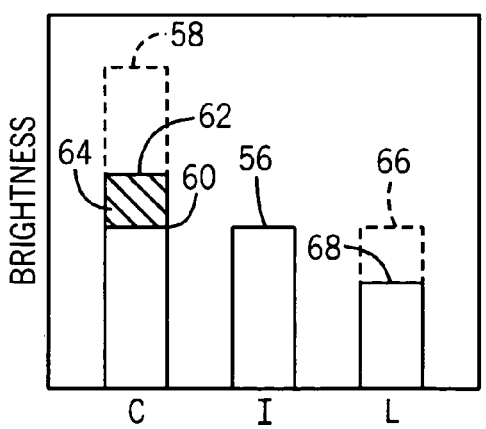
FIG. 2A is a graph depicting an embodiment of a process for coordinating a projector and a screen of the projection system of FIG. 1 according to an example embodiment.
Figure 2B:
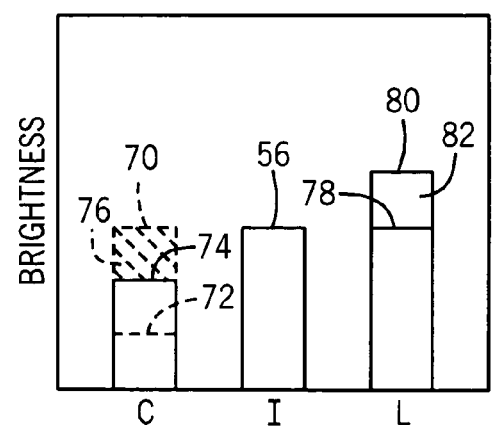
FIG. 2B is a graph depicting another embodiment of a process for coordinating the projector and the screen of the projection system of FIG. 1 according to an example embodiment.

FIGS. 2A and 2B illustrate one example mode of operation by which controller 28 coordinates the operation of screen 12 and projector 14 to attain a desired image reflected from screen 12. In particular, FIGS. 2A and 2B illustrate controller 28 adjusting or modifying output from projector 14 to accommodate responsiveness of screen 12. FIG. 2A is a graph depicting a desired brightness 56 of a portion of an image to be reflected from screen 12 as a result of the overlapping of a chrominance component C of the image I provided by screen 12 and the grayscale or luminance component L of the image I provided by projector 14. In the particular example shown in FIG. 2A, the one or more pixels 20 of screen 12 are attempting to respond to control signals from controller 28 to adjust from a brightness level 58 which may have resulted in an image in a previous frame to a desired brightness level 60 to achieve the desired brightness level 56 for the reflected image I. However, in the example shown, screen 12 is insufficiently responsive such that the one or more pixels 20 of screen 12 do not change at a sufficient rate to attain the desired brightness level 60 in time. As a result, one or more pixels 20 of screen 12 alternatively have a brightness level of 62, resulting an excess brightness 64.

As further shown by FIG. 2A, controller 28 generates control signals to adjust the operation of projector 14 to accommodate the excess brightness 64 resulting from the insufficiently fast response of the one or more pixels 20 of screen 12. In particular, controller 28 generates control signals directing projection 14 to project light having a grayscale luminance component L less than the luminance level than would otherwise have been provided to form reflected image I with the brightness level 56 had screen 12 been sufficiently responsive to achieve the brightness level 60. In particular, controller 28 generates control signals based upon instructions in memory 26 downwardly adjusting the brightness level of the light projected by projector 14 towards the one or more pixels 20 from brightness level 66 to brightness level 68 based upon an anticipated responsiveness of screen 12. As a result, the desired brightness level 56 of the image I reflected from screen 12 is achieved with a less responsive screen 12, enabling a less responsive and potentially less expensive screen 12 to be used as part of projection system 10.

FIG. 2B illustrates an example scenario in which one or more pixels 20 of screen 12 should reflect light at a brightness level 70 to provide the reflected image I with a brightness level 56. However, in increasing its brightness level from level 72, the one or more pixels 20 are relatively slow in responding or changing such that the one or more pixels 20 have a brightness level 74 at a particular moment in time rather than a brighter level of 70, resulting in a shortfall 76.

In anticipation of the shortfall 76 based upon the relatively slow responsiveness of the one or more pixels 20 of screen 12, controller 28 generates control signals adjusting the operation of projector 14 to compensate for such shortfall 76. In particular, in lieu of generating control signals directing projector 14 to project the grayscale component 24 at a brightness level 78 which would otherwise be chosen for providing the selected image I with the desired brightness 56, controller 28 alternatively generates control signals directing projector 14 to project the grayscale component 22 with a brightness level 80 greater than brightness level 78. Brightness level 80 has an excess brightness amount 82. The excess brightness provided by projector 14 to one or more pixels 20 compensates for the shortfall 76 resulting from the relatively slow responsiveness of the one or more pixels 20 of screen 12.

According to one exemplary embodiment, memory 26 contains data for predetermined response rates for individual pixels or for the entirety of screen 12. Based on such response rates stored in memory 26, processor 28, following instructions contained in memory 26, anticipates a shortfall or excess in brightness and compensates for such excess or shortfall in brightness by adjusting the brightness of output produced by projector 14. In other embodiments, the response rate data for screen 12 may be input to controller 28 from another computing device or manually, or may be calculated or sensed from sensed actual operation of screen 12. In still other embodiments in which projector 14 may have a relatively slower responsiveness as compared to screen 12, screen 12 may be adjusted to compensate for excess or shortfalls of brightness in the light output of projector 14. In yet other embodiments, memory 26 may omit such instructions for compensation based upon the responsiveness of screen 12 or projector 14.

Figure 3:
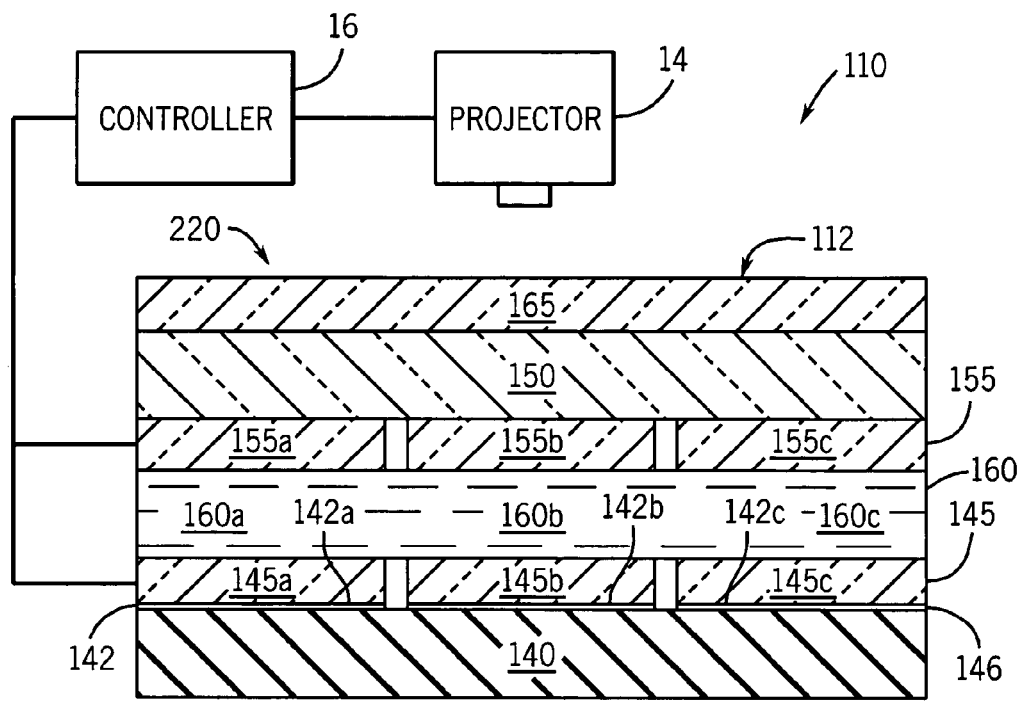
FIG. 3 is a schematic illustration of another embodiment of the projection system of FIG. 1 according to an example embodiment.

FIGS. 3-5 schematically illustrate projection system 110, another embodiment of projection system 10 shown and described with respect to FIG. 1. Projection system 110 is similar to projection system 10 except that projection system 110 includes screen 112, a particular embodiment of screen 12. For ease of illustration, those remaining components of system 110 which correspond to components of system 10 are numbered similarly. For ease of illustration, FIG. 3 illustrates a single pixel 220 of screen 112. According to one exemplary embodiment, screen 112 includes a plurality of such pixels 220 positioned generally adjacent to one another. Each pixel 220 generally includes back substrate 140, reflective layer 142, electrode layer 145, front substrate 150, electrode layer 155, active layer 160 and coating layers 165. Back substrate 140 serves as a support for reflective layer 142. In one embodiment, back substrate 140 comprises dielectric material such as polyethylene terephthalate (PET) or glass. In other embodiments, back substrate 140 may be formed from other materials.

Reflective layer 142 comprises a layer of visible light reflecting material supported by back substrate 140. According to one example embodiment, layer 142 is formed from a transmissive color filter material formed on top of a reflective metallic film such as aluminum. In other embodiments, layer 142 may be found from other materials such as reflective color patterns. For example, colored dots may be patterned upon substrate 140 by inkjet printing. In still other embodiments, light transmissive color filter materials may be provided adjacent to electrode layer 155, such as between front substrate 150 and electrode layer 155. In another embodiment, reflective layer 142 may alternatively be configured so as to reflect substantially all light without substantially filtering or absorbing light.

As shown by FIG. 3, for each pixel 220, reflective layer 142 is partitioned or divided into distinct reflectors 142a, 142b and 142c. Reflectors 142a, 142b and 142c are configured to reflect distinct colors or wavelengths of visible light such as red, green and blue or such as cyan, magenta and yellow colored light, respectively. In other embodiments, reflectors 142a, 142b and 142c may comprise distinctly colored filters over a reflective layer. Although reflectors 142a, 142b and 142c are illustrated as generally be located proximate to back substrate 140, reflectors 142a, 142b and 142c may alternatively be located adjacent to active layer 160 or between active layer 160 and back substrate 140 while still permitting electrode layer 145 to operate as described below.

Electrode layer 145 comprises a layer of electrically conductive material configured to be electrically charged so as to apply an electric field across active layer 160. Electrode layer 145 includes distinct electrically conductive portions or elements 145a, 145b, 145c configured to selectively apply distinct voltages across active layer 160 to control the opacity or translucency of adjacent portions of active layer 160. In the particular embodiment illustrated, electrode elements 145a, 145b and 145c are formed from the transparent or translucent electrically conductive materials and overlie reflective elements 142a, 142b and 142c of reflective layer 142. For example, one embodiment, electrode layer 145 may comprise a conductive material such as indium tin oxide (ITO) or polyethylenedioxythiophene (PEDOT). In other embodiments, electrode elements 145a, 145b and 145c may themselves be configured to reflect different colors of light such as red, green and blue or such as cyan, magenta and yellow, enabling reflective layer 142 to be omitted. In other embodiments, reflectors 142a-142c may themselves be electrically conductive, permitting reflectors 142a, 142b and 142c to be positioned on electrode elements 145a-145c, respectively, adjacent active layer 160. In other embodiments, electrode layer 145 may be formed from other electrically conductive materials.

Front substrate 150 comprises a support structure for electrode layer 155. Front substrate 150 is formed of an optically transparent and clear dielectric material. In one embodiment, front substrate 150 may be formed from an optically clear and flexible dielectric material such as polyethylene terephthalate (PET). In other embodiments, front substrate 150 may be formed from other transparent dielectric materials that may be inflexible such as glass.

Electrode layer 155 comprises a layer of transparent or translucent electrically conductive material formed upon front substrate 150. Electrode layer 155 is configured to be charged so as to cooperate with electrode layer 145 to create an electric field across active layer 160. For each pixel 220, electrode layer 155 is partitioned into distinct portions or elements 155a, 155b and 155c configured to be independently charged to distinct voltages to create differing electrical fields across active layer 160. In one embodiment, electrode layer 155 comprises a transparent conductor such as indium tin oxide (ITO) or polyethylenedioxythiophene (PEDOT). In other embodiments, other transparent conductive materials may be used. Electrode layer 155 and electrode layer 145 are each electrically connected to controller 16 which controls the charges created across electrode layers 145 and 155.

In one embodiment, electrode elements 145a-145c and elements 155a-155c of each pixel 220 are configured to be independently charged. In one embodiment, electrode elements 145a-145c and electrode elements 155a-155c of each of pixels 220 are electrically connected to a voltage source by an active matrix of electrical switching devices provided in electrode layer 145, back substrate 140 or another active back plane. Examples of switching devices may include thin film transistors and metal-insulator-metal devices.

In other embodiments, electrode elements 145a-145c of each pixel 220 may be configured to be independently charged to distinct voltages with the other electrode elements not configured in this fashion. In such an embodiment, electrode layer 155 may alternatively comprise a single continuous layer of electrically conductive material extending opposite to electrode elements 145a-145c. In another embodiment, electrode elements 155a-155c of each pixel 220 may be configured to be independently charged with the other electrode elements not configured in this fashion. In such an embodiment, electrode elements 145a-145c may alternatively be replaced with a single continuous layer of electrically conductive material extending across each of reflectors 142a-142c.

Active layer 160 comprises a layer of material configured to change its transparency and reflectivity in response to changes in an applied voltage or charge. In one embodiment, active layer 160 may change from a transparent layer, allowing light to pass through active layer 160 and to be reflected from at least one of reflectors 142a-142c of electrode layer 145, to a generally opaque state in which light is absorbed by active layer 160. According to one example embodiment, active layer 160 may comprise a dichroic dye doped polymer dispersed liquid crystal (PDLC) layer in which pockets of liquid crystal material are dispersed throughout a transparent polymer layer. In other embodiments, active layer 160 may comprise other materials such as electrochromic material, such as tungsten oxide or photochromic or electropheretic material.

Active layer 160 is generally disposed between electrode layers 145 and 155. In one embodiment, active layer 160 is a layer of material continuously extending and captured between electrode layers 145 and 155. For each pixel 220, active layer 160 includes regions 160a, 160b and 160c. Regions 160a-160c generally extend between electrode elements 145a, 155a, electrode elements 145b, 155b and electrode elements 145c, 155c, respectively, and independently respond to voltage changes across the corresponding electrode elements by changing translucency. Regions 160a, 160b and 160c are generally situated across from reflectors 142a, 142b and 142c, respectively. As a result, the opacity or translucency of regions 160a, 160b and 160c effects how much, if any, incident light may reach and be reflected off of reflectors 142a, 142b and 142c, respectively.

Coating layer 165 generally comprises one or more layers deposited or otherwise formed on front substrate 150 opposite to electrode layer 155. Coating layer 165 may comprise a front plane diffuser and may include an anti-reflection layer such as anti-glare surface treatment, an ambient rejection layer, such as a plurality of optical band pass filters such as those commercially available from 3M, or a series of micro lenses and/or partial diffuse layers. In other embodiments, coating layer 165 may be omitted.

FIGS. 4 and 5 illustrate operation of projection system 110. FIG. 4 illustrates one of pixels 220 in a light-absorbing state such that the image reflected from screen 112 has a black or darkened portion corresponding to pixel 220. As shown by FIG. 4, a zero voltage is applied across each of electrode elements 145a, 155a, 145b, 155b and electrode elements 145c, 155c. As a result, active layer 160 between each pair of opposite electrode elements is in a substantially opaque state in which light, such as ambient light 270, is absorbed such that little if any of ambient light 270 or light from projector 14 (shown in FIG. 3) is reflected from pixel 220. Because active layer 160 of pixel 220 absorbs ambient light 270 rather than partially reflecting light, projector system 110 has an increased contrast ratio in the given ambient light environment.

FIG. 5 illustrates one of pixels 220 of screen 212 in a reflecting state. In particular, FIG. 5 illustrates controller 16 generating control signals causing electrode elements 145a and 155a to be charged to create a voltage ($V_{sat}$) across region 160a of active layer 160 between electrode elements 145a and 155a. At the same time, control system 16 generates control signals which result in a voltage (including a zero voltage) being applied across regions 160b and 160c by electrode elements 145b and 155b and electrode elements 145c and 155c, respectively, such that regions 160b and 160c are opaque or partially translucent. As a result, light 122a from projector 14 passes through region 160a, which is substantially translucent, and through the transparent conductive material of electrode element 145a to reflect off of reflector 142a as reflected light 164 which forms part of the reflected image from screen 122. At the same time, light 122b and 122c are substantially absorbed by regions 160b and 160c prior to reaching reflectors 142b and 142c, respectively. As a result, light 164 reflected from the particular pixel 220 has the chrominance or color of reflector 142a. In the particular example shown in which reflector 142a is red, the particular pixel 220 reflects light having a red colored wavelength. The shade of light 164 is further effected by the particular grayscale of incident light 122a directed at the particular pixel 220 by projector 14. As a result, light 164 has a relatively large contrast ratio and color saturation.

Although the particular pixel 220 shown in FIG. 5 is illustrated as substantially absorbing all rays of light 122b and 122c in regions 160b and 160c, respectively, while substantially reflecting all of light 122a off of reflector 142a, at other instances, one or both of light 122b and 122c may also or alternatively be reflected off of reflectors 142b and 142c as a result of controller 16 generating control signals causing voltages to be applied across regions 160b and 160c by electrode elements 145b, 155b and electrode elements 145c, 155c, respectively. In particular embodiments, the voltage applied across one or more of regions 160a-160c of each pixel 220 may be created so as to vary the amount of light 122a-122c absorbed by regions 160a-160c and the amount or percent of light 122a-122c reflected by one or more of reflectors 142a-142c, respectively. For example, voltages may be applied across regions 160a-160c of the pixel 220 shown in FIG. 5 such that portions or percentages of light 122a-122c are reflected by two or more of reflectors 142a-142c. Multiple chrominances or colors may be reflected from pixel 220 by combining different intensities of light reflected from two or more of reflectors 142a-142c.

Figure 6:
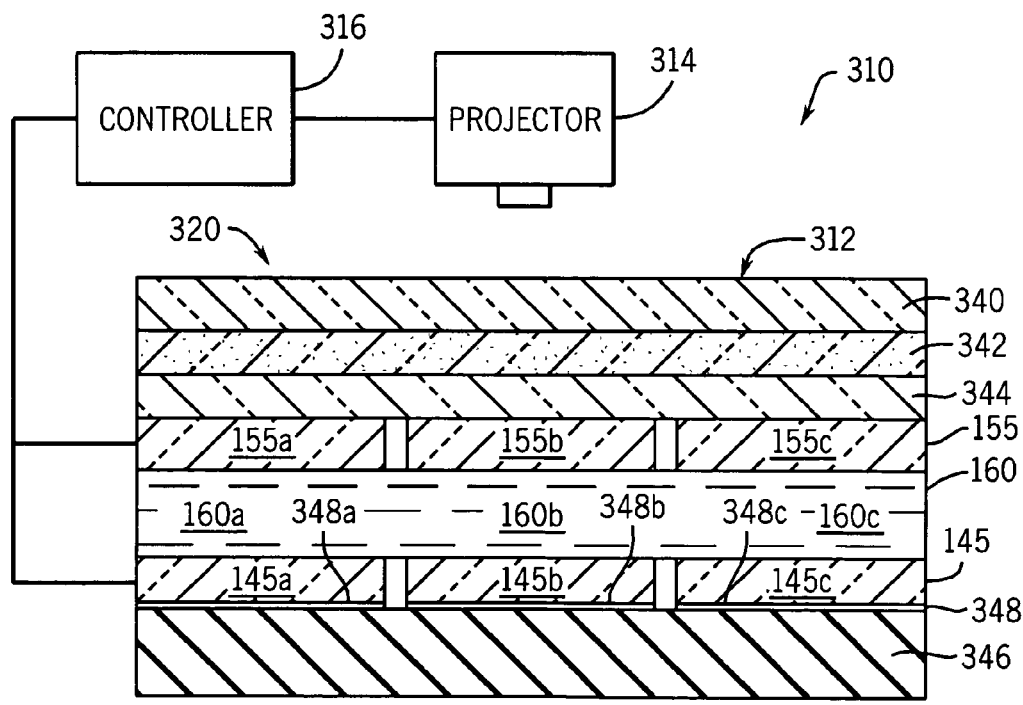
FIG. 6 is a schematic illustration of another embodiment of the projection system of FIG. 1 according to an example embodiment.

FIG. 6 schematically illustrates projection system 310, another embodiment of projection system 10. Projection system 310 is similar to projection system 110 except that projection system 310 comprises a rear projection system. Projection system 310 generally includes screen 312, projector 314 and controller to 316. For ease of illustration, FIG. 6 illustrates a single pixel 320 (which may be composed of multiple subpixels usually representing color RGB and represented in FIG. 6 as 155a, 155b, 155c and the corresponding 145a, 145b, 145c) of screen 312. According to one example embodiment, screen 312 includes a plurality of such pixels 320 positioned generally adjacent to one another. Each pixel 320 generally includes back substrate 340, and may, in other embodiments, also include responsive light emitting layer 342, intermediate substrate 344, electrode layer 155, front substrate 346, filter layer 348, electrode layer 145 and active layer 160. Back substrate 340 serves as a support for responsive light emitting layer 342. In one embodiment, back substrate 340 comprises dielectric materials such as glass or polyethylene terephthalate (PET). In other embodiments, back substrate 340 may be formed from other materials or may be omitted.

Responsive light emitting layer 342 comprises a layer of material configured to emit visual light in response to being impinged by light. In one embodiment, layer 342 comprises a layer of phosphor material configured to emit light upon being irradiated by ultraviolet light. In one embodiment, layer 342 is formed from phosphors that are configured to emit varying levels of white light in response to being impinged by varying levels of ultraviolet light. In still other embodiments, layer 342 may be formed from other materials that are configured to emit white light in response to being irradiated by other forms of light.

Intermediate substrate 344 comprises one or more layers of materials configured to overlie and protect layer 342 and to also support electrode layer 155. Layer 344 is formed from a transparent or translucent dielectric material such as glass or PET. In other embodiments, layer 344 may be formed from other transparent or translucent materials. In yet other embodiments, layer 344 may be omitted where electrode layer 155 is formed upon layer 342.

Electrode layer 155, electrode 145 and active layer 160 are described above with respect to projection system 110 and function similarly in projection system 310. As noted above, electrode layers 145 and 155 selectively apply electric fields across active layer 160 to control or adjust the translucency of regions 160A, 160B and 160C of active layer 160.

Front substrate 346 comprises of one or more layers of transparent or translucent material configured to support electrode layer 145 and filter layer 348. In one embodiment, front substrate 346 may comprise a dielectric material such as glass or PET. In other embodiments, front substrate 346 may be formed from other materials.

Filter layer 348 comprises a layer of one or more materials located proximate a front 350 of screen 320. In the particular an example illustrated, filter layer 348 is disposed between electrode layer 145 and substrate 346. In other embodiments, filter layer 348 may alternatively be disposed between active layer 160 and electrode layer 145 or upon or within front substrate 346. Filter layer 348 includes distinct subfilters 348a, 348b and 348c. Subfilters 348a, 348b and 348c are each configured to filter distinct wave lengths of light. For example, in one embodiment, subfilter 348a is configured to substantially attenuate non-red wavelengths of light, while allowing red wavelengths to pass through with much less attenuation subfilter 348b is configured to substantially attenuate non-green wavelengths of light, while allowing green wavelengths to pass through with much les attenuation and subfilter 348c is configured to substantially attenuate non-blue wavelengths of light, while allowing blue wavelengths to pass through with much less attenuation. In other embodiments, in which responsive light emitting layer 342 includes distinct portions configured to emit distinct colors of light, such as red, green and blue, upon being irradiated by other light such as UV light, filter layer 348 may be omitted.

Projector 314 is a device configured to project a luminance image or luminance information towards and upon screen 312. In particular, projector 314 is configured to impinge responsive light emitting layer 342 with a luminance image or luminance information. In one embodiment, projector 314 is configured to project ultraviolet light which serves as a carrier for such luminance information. For example, in one embodiment, projector 314 is configured to emit a pattern or arrangement of distinct intensities of ultraviolet light towards layer 342. In other embodiments, projector 314 may be configured to project other forms of electromagnetic radiation or light which serve as carriers for luminance information of an image to be presented by screen 312.

Controller 316 comprises a processing unit configured to generate control signals directing the operation of projector 314 and screen 312 based upon the desired image to be presented at screen 312. In operation, controller 316 receives data or otherwise determines color data for color components (red, green, blue) of a pixel of an image frame and luminance data (data representing a relative intensity, such as a relative brightness, of each pixel of the image frame) to be presented at screen 312. Based upon the luminance data, controller 316 generates control signals directing projector 314 to project light, such as ultraviolet light, in a pattern or arrangement having different intensities which correspond to the desired intensity of different pixels relative to one another of the desired image. Such light from projector 314 impinges layer 342, causing layer 342 to emit visual light in generally the same pattern or arrangement.

At the same time, controller 316 generates control signals based upon the color components (RGB components) of each pixel to selectively control the translucency of active regions 160a, 160b and 160c such that light emitted by layer 342 (representing the luminance) is selectively allowed to pass through regions 160a, 160b, 160c and to be selectively filtered by subfilters 348a, 348b and 348c to provide appropriate levels of each color component for each pixel. For example, distinct electric field may be applied across regions 160a, 160b and 160c to vary the amount of light emitted by layer 348 that passes through such regions and that is attenuated by subfilter 348a, 348b and 348c. The resulting light passing through front substrate 346 at the front 350 of screen 312 has varying brightness levels from one pixel 320 to another pixel 320 based upon luminance information projected by projector 314 and the selective attenuation of light by regions 160a, 160b and 160c of each pixel 320. In one embodiment, projector 314 projects luminance information at a higher resolution as compared to the color image provided by screen and based upon pixels 320.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A projection system comprising:
   a screen configured to display colors; and
   a projector configured to project a luminance image on the screen, wherein the screen is configured to display a color image and wherein the luminance image has a greater resolution than the color image.

2. The system of claim 1 further comprising a controller configured to generate control signals directing operation of the screen such that the screen actuates between a first state in which substantially an entirety of the screen is red, a second state in which the substantial entirety of the screen is blue and a third state in which the substantial entirety of the screen is green.

3. The system of claim 2, wherein the controller is configured such that the control signals direct the screen to be in each of the first state, the second state and the third state at least 50 times per second.

4. The system of claim 1 further comprising:
   a controller to communicate with the screen and the projector, wherein the controller is configured to generate control signals based upon image data to direct the screen to display the color image and the projector to project the luminance image on the screen.

5. The system of claim 4, wherein the controller is configured to generate control signals based upon an anticipated discrepancy between a desired intensity of a color image and an anticipated actual intensity of the color image displayed by the screen and wherein the projector includes a configuration to project the luminance image on the screen in response to the control signals.

6. The system of claim 1, wherein the screen includes independently actuatable screen pixels.

7. The system of claim 6, wherein each screen pixel comprises:
electrodes;
a switching medium between the electrodes; and
a plurality of differently colored reflector or filter surfaces proximate the switching medium.

8. The system of claim 7, wherein the switching medium comprises a polymer dispersed liquid crystal.

9. The system of claim 6, wherein each pixel is configured to selectively display distinct colors.

10. A controller comprising:
a memory containing instructions to display a color image upon a screen by controlling output of greater than three screen pixels and to project a luminance image on the color image, wherein each pixel including a plurality of differently colored reflector or filter surfaces proximate a switching medium; and
a processor configured to generate control signals based upon the instructions, wherein the color image has a first resolution and wherein the luminance image has a second greater resolution.

11. The controller of claim 10, wherein the memory further comprises:
instructions to separate image data into color data and luminance data.

12. The controller of claim 10, wherein the processor is configured to generate control signals based upon the responsiveness of a screen to changes in the color image.

13. The controller of claim 12, wherein the memory contains predetermined response rates of the screen to changes in the color image.

14. A processor readable medium comprising:
instructions to display a color image upon a screen; and
instructions to project a luminance image on the screen by controlling color output of greater than three screen pixels, wherein the color image has a first resolution and wherein the luminance image has a second greater resolution.

15. The processor readable medium of claim 14 further comprising instructions to separate image data into color data and luminance data.

16. The processor readable medium of claim 14 further comprising instructions to adjust the luminance image based upon responsiveness of the screen to changes in the color image.

17. The processor readable medium of claim 14, wherein the instructions to display a color image upon the screen comprises instructions to selectively charge electrodes proximate a switching medium to vary a translucency of the medium.

18. An apparatus comprising:
means for communicating color data of an image to a screen so as to control more than three screen pixels; and
means for communicating luminance data of the image to a projector, wherein the color data of the image has a first resolution and wherein the luminance data of the image has a second greater resolution.

19. A method comprising:
displaying colors upon a screen; and
projecting a luminance image on the colors, wherein displaying colors further comprises displaying a color image upon the screen and wherein the color image has a first resolution and wherein the luminance image has a second greater resolution, wherein one of the screen and a projector projecting the luminance image have a slower response rate as compared to the other of the screen and the projector and wherein the method further comprises adjusting an intensity of the other of the screen and the projector based upon the slower responsitivity of said one of the screen and the projector.

20. The method of claim 19, wherein displaying colors upon the screen further comprises displaying a red color on a substantial entirety of the screen, displaying a green color on the substantial entirety of the screen and displaying a blue color on the substantial entirety of the screen.

21. The method of claim 19 further comprising:
adjusting the luminance image based upon a responsiveness of the screen to changes in the color image.

22. The method of claim 19 further comprising actuating pixels of the screen independently of one another.

23. The method of claim 22 further comprising applying different electrical fields to distinct portions of one of the pixels.

24. A controller comprising:
a memory containing instructions to display a color image upon a screen and to project a luminance image on the color image; and
a processor configured to generate control signals for a projector to project the luminance image based upon the instructions, wherein the processor is configured to generate control signals based upon the responsiveness of a screen to changes in the color image.

25. A method comprising:
displaying colors upon a screen; and
projecting a luminance image on the colors, wherein displaying colors upon the screen further comprises displaying a red color on a substantial entirety of the screen, displaying a green color on the substantial entirety of the screen and displaying a blue color on the substantial entirety of the screen.

26. The system of claim 1, wherein the screen is configured to reflect the luminance image towards a viewer.

* * * * *